United States Patent
Ito et al.

(10) Patent No.: US 6,463,222 B1
(45) Date of Patent: Oct. 8, 2002

(54) ELECTRONIC CAMERA

(75) Inventors: Takeshi Ito, Hino; Yoichi Washizu, Higashimurayama, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/516,294

(22) Filed: Mar. 1, 2000

(30) Foreign Application Priority Data

Mar. 1, 1999 (JP) .......................................... 11-052773

(51) Int. Cl.$^7$ .......................... G03B 17/02; H04N 5/30; H04N 5/225
(52) U.S. Cl. ........................ 396/541; 396/429; 396/535; 348/335; 348/373; 348/374
(58) Field of Search ................................ 396/529, 535, 396/541, 429; 348/335, 340, 373, 374, 375, 376, 333.01

(56) References Cited

U.S. PATENT DOCUMENTS

| | | | |
|---|---|---|---|
| 4,961,115 A | * | 10/1990 | Jessop ........................ 348/335 |
| 5,003,401 A | * | 3/1991 | Otsuka ........................ 348/335 |
| 5,032,919 A | * | 7/1991 | Randmae ..................... 348/335 |
| 5,221,964 A | * | 6/1993 | Chamberlain et al. ...... 348/335 |
| 5,400,073 A | * | 3/1995 | Morioka et al. ............. 348/335 |
| 5,739,853 A | * | 4/1998 | Takabashi .................... 348/335 |
| 5,946,031 A | * | 8/1999 | Douglas ...................... 348/373 |
| 6,166,765 A | * | 12/2000 | Toyofuku .................... 348/220 |

* cited by examiner

Primary Examiner—Alan A. Mathews
(74) Attorney, Agent, or Firm—Straub & Pokotylo; John C. Pokotylo

(57) ABSTRACT

The electronic camera comprises a photographing unit including a lens tube which holds a lens for forming an image of object light on a photographing element, and a photographing board disposed on a proximal end side of the lens tube, on which a photographing unit for outputting a signal photoelectric-converted by the photographing element, as an image signal, and a frame which holds each of a finder unit and an electric board, and has an opening section formed therein, which allows the photographing unit to be mounted on or removed from along a direction which crosses with the optical axis of the lens.

13 Claims, 2 Drawing Sheets

ELECTRONIC CAMERA

CROSS-REFERENCE TO RELATED APPLICATION

This application is based upon and claims the benefit of priority from the prior Japanese Patent Application No. 11-052773, filed Mar. 1, 1999, the entire contents of which are incorporated herein by reference.

BACKGROUND OF THE INVENTION

The present invention relates to an electronic camera, and more specifically, to a type with an improved assembling property. In general, an electronic camera consists of an internal unit obtained by combining a lens tube, an imaging board, an electric board, mechanical parts and the like into a unit, and a front cover and a rear cover which cover the internal unit from the front and rear directions. Generally, the main functions of a camera, that is, the image forming and reproduction, are achieved only by the internal unit, and these functions can be inspected for making it effective in terms of assembling property and services. Such an internal unit is assembled, and then adjusted and tested, and the front cover and the rear cover are put thereon to finish the camera.

The internal unit includes a frame used for mounting parts such as the lens tube, the imaging board and the like, as well as for maintaining the rigidity of the camera after it is completed. In usual cases, an electronic camera is required to be made small in size, and therefore the parts such as the lens tube, imaging board, electric board, finder are assembled with the frame at high density.

In the meantime, it is usual that the lens tube is mounted onto the front surface side of the frame, and the imaging board and the like are mounted onto the rear surface side. With this structure, the lens tube is mounted such that it is inserted into the opening section provided in the frame along its optical axial direction, and then the proximal end side of the lens tube is connected to the imaging board.

The above-described conventional electronic camera entails the following problem. That is, the lens tube and the imaging board are separately mounted onto the frame, and they are connected to each other via a flexible cable or the like. The imaging board is mounted to be laminated on some other electric board. The lens tube mainly consists of mechanical parts, and therefore in many cases, the tube is subjected to the test and adjustment solely or in combination with the imaging board at the stage of testing and adjustment and the like of the internal unit, or the stage of servicing, since these mechanical parts have characteristics different from those other parts such as electric board. However, if these members are mounted on the frame as described above, other boards or parts must be removed for testing, and therefore the operational efficiency is extremely low.

BRIEF SUMMARY OF THE INVENTION

The object of the present invention is to provide an electronic camera capable of easily removing or replacing the lens tube or the like, while the frame maintains its functions as the structure of the camera, without detaching other electric parts already assembled as an integral unit.

The present invention includes a photographing unit including a lens tube which holds a lens for forming an image of object light on a photographing element, and a photographing board disposed on a proximal end side of the lens tube, on which a photographing unit for outputting a signal photoelectric-converted by the photographing element, as an image signal, and a frame which holds each of a finder unit and an electric board, and has an opening section formed therein, which allows the photographing unit to be mounted on or removed from the frame along a direction which crosses with the optical axis of the lens.

According to the present invention, it becomes possible to remove or replace the lens tube or the like easily, while the frame maintains its functions as the structure of the camera, without detaching other electric parts already assembled as an integral unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will now be described with reference to the accompanying drawings.

Figure 1:
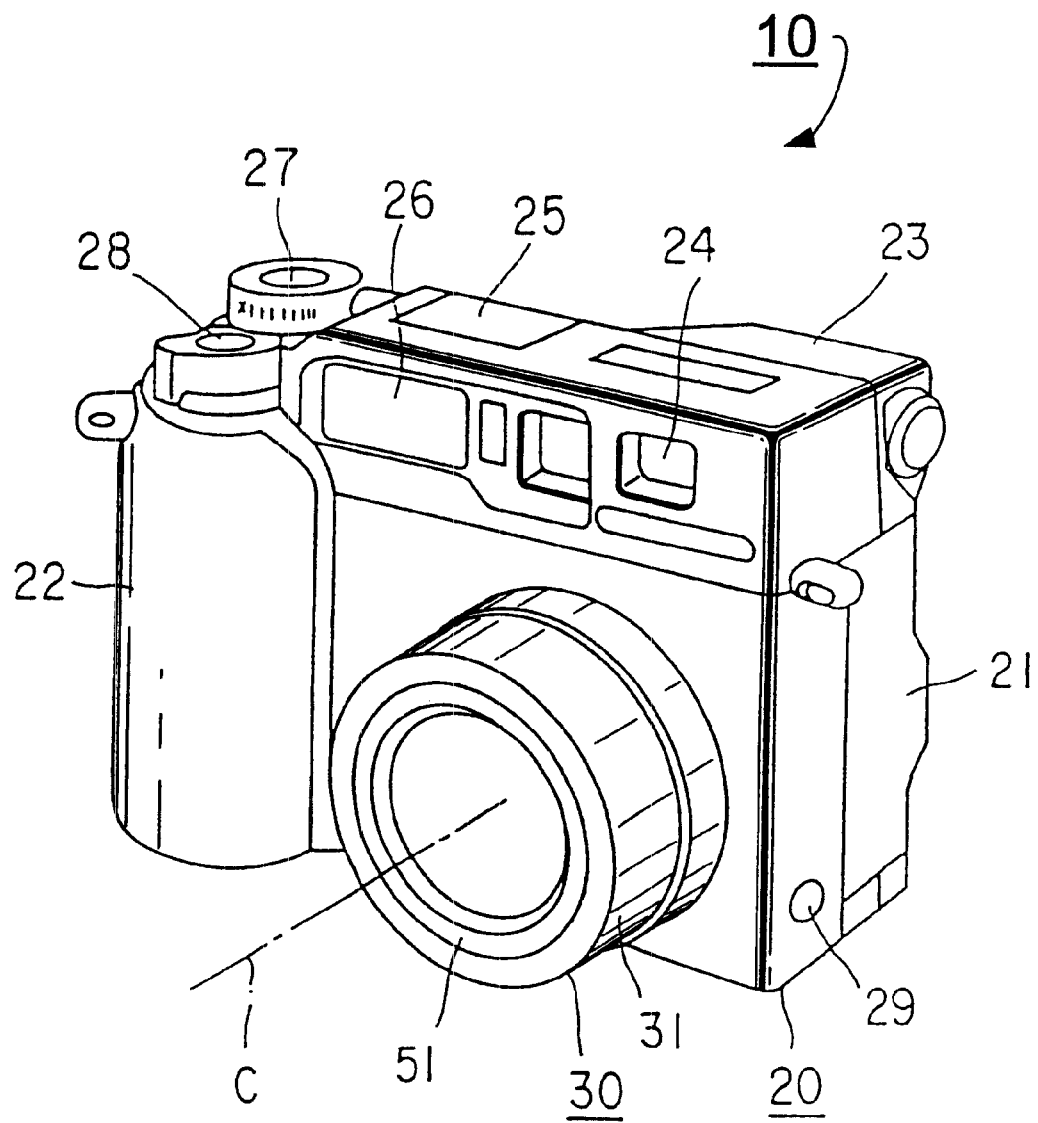
FIG. 1 is a perspective view showing an appearance of an electronic camera according to the first embodiment of the present invention.
Figure 2:
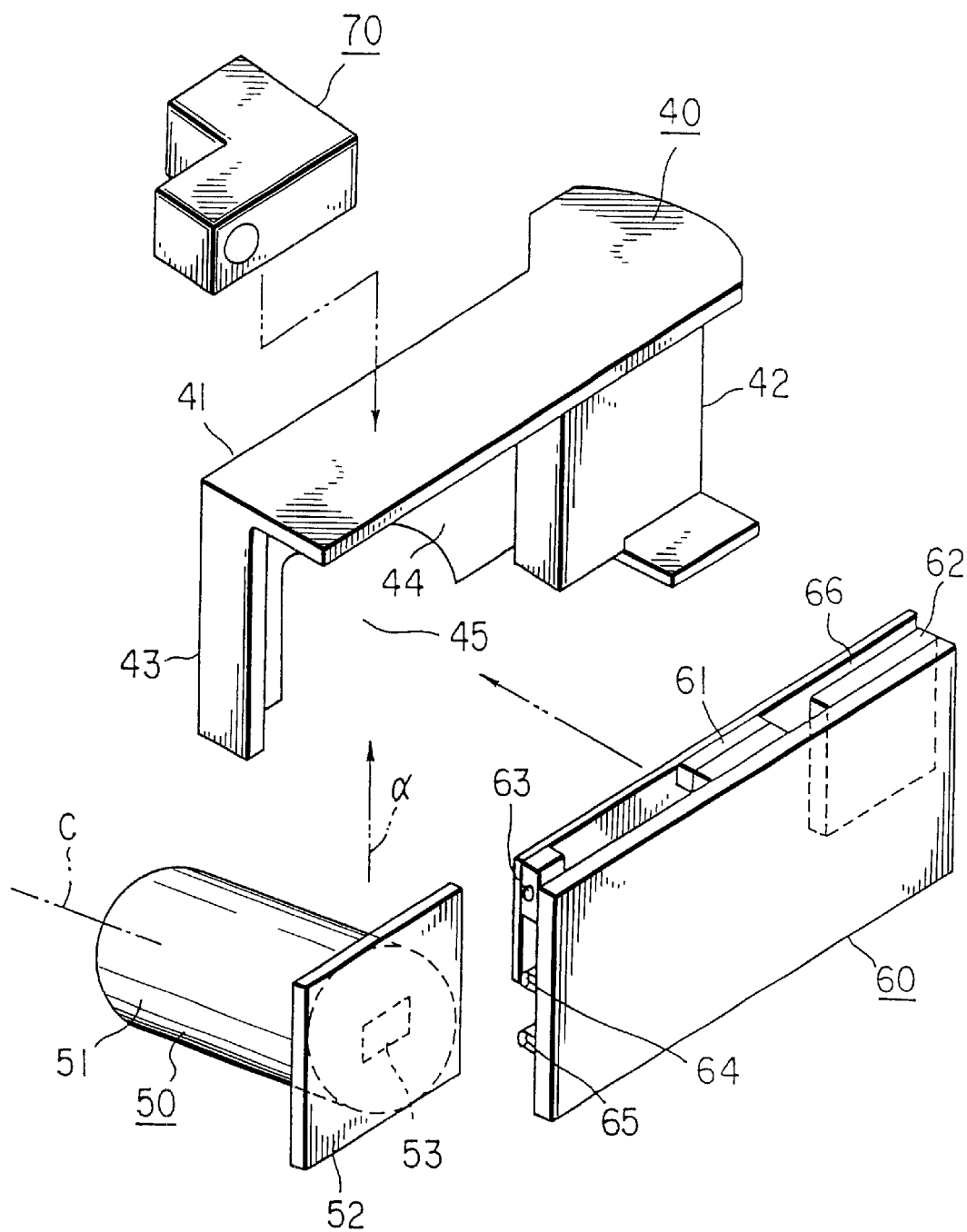
FIG. 2 is a partially cut-out perspective view showing the main portion of the electric camera.

FIG. 1 is a perspective view showing an appearance of an electronic camera 10 according to the first embodiment of the present invention, and FIG. 2 is a partially cut-out perspective view showing the main portion of the electric camera 10.

The electronic camera 10 includes a camera main body 20 and a lens portion 30 provided on a front surface side of the camera main body 20.

The camera main body 20 has a housing 21. A grip 22, a finder eye piece 23, a finder window 24, a control panel 25, a strobe flash 26, a release switch 27, a zoom lever 28 and X-contact point 29 are provided in the housing 21. Inside the housing 21, a frame 40 and the like (see FIG. 2) are contained.

The lens portion 30 is formed to be cylindrical, and has a lens container unit 31 in which a lens tube 51 consisting of a zoom lens, described later, and a zoom lens 51 provided coaxial with respect to the lens container portion 31. It should be noted that one-dot chain line C represents an optical axis of the lens tube 51.

Inside the camera main body 20, the frame 40, the photographing unit 50 mounted on the frame 40, the electric board 60 connected to the photographing unit 50, the finder unit 70 and the like are contained as shown in FIG. 2.

The frame 40 includes a frame upper portion 41 on which the finder unit 70 is mounted, and formed along a lateral direction of the camera main body 20, a frame right portion 42 provided to be jointed to the frame upper portion 41, and formed along the up-and-down direction of the camera main body, and a frame left portion 43 provided to be jointed to the frame upper portion 41, and formed along the up-and-down direction of the camera main body. Further, between the frame right portion 42 and the frame left portion 43, an opening section 44 is made. The width of an opening end 45 of the opening section 44 is formed to be larger than an outer diameter of the lens tube 51, described later.

The photographing unit 50 includes the lens tube 51, the photographing board 52 set on the proximal end side of the lens tube 51, and the photographing element 53 provided on the photographing board 52.

The lens tube 51 holds a lens for forming an image of object light on the photographing element 53. A signal which has been photoelectrically converted from a light image formed by the lens by the photographing element 53 is subjected to a process such as amplification or the like in the photographing board 52, and outputted to the electric boards 60 and 66.

Various types of electric parts, as well as mechanical parts such as a board connector 61, an AC jack 63, a video output jack 64 and a digital output jack 65, are mounted on the electric board 60.

A card slot unit 62 to which a card-like recording medium (not shown) is inserted, is mounted on the electric board 66. The electric boards 60 and 66 are connected together via the board connector 61. The electric boards 60 and 66 have, for example, a recording circuit for digitally processing an image signal and recording its image data onto a memory card set into the card slot unit 62, an output circuit for converting the image data into a TV signal and outputting it from the video output jack 64, a power circuit for voltage-converting a power input from the AC jack 63 and a battery and supplying it to each circuit.

The electronic camera 10 having the above-described structure is assembled in the following manner. That is, first, the photographing unit 50 is assembled by connecting the lens tube 51 and the photographing board 52. Meanwhile, the electric boards 60 and 66 and the finder unit 70 are assembled onto the frame 40.

Next, the photographing unit 50 is inserted from the opening end 45 side into the opening section 44 along the directed indicated by an arrow a in FIG. 2, and then it is fixed to the frame 40. It should be noted that the arrow α direction is a direction crossing with the optical axis C (at right angles in this embodiment). Further, the photographing board 52 and the electric board 60 are flexibly connected to the frame 40.

The operation test is carried out in the above-described state. In case where some kind of error occurs on the photographing unit 50, the connection between the photographing board 52 and the electric board 60 is released, so as to remove the photographing unit 50 from the opening section 44 side. Further, the photographing unit 50 is solely subjected to the operation test, adjustment and the like, and then set back to the frame 40.

Here, it is not necessary to separate the lens tube 51 and the photographing board 52 from each other, the photographing unit 50 can be easily attached to or detached from the frame 40.

In the meantime, the photographing unit 50 is mounted on the opening end 45 of the frame 40 and thus the lens tube 51 and the photographing board 52 of the photographing unit 50 serve as a reinforcing member. Further, the opening section is closed as these members are bridged over the opening end 45, making it possible to increase the rigidity of the frame 40. That is, the frame 40 is formed into a bridgeable shape having a certain section opened, and as the reinforcing member is bridged over to the opening end 45 side, the assembly of a high rigidity can be achieved.

As described above, in the electronic camera 10 according to this embodiment, the photographing unit containing the lens tube and the like can be removed or replaced while the frame maintaining its functions as the structure of the camera and without detaching other electric parts already assembled as an integral unit.

It should be noted that the present invention is not limited to the above-described embodiment. More specifically, in the embodiment, the opening end of the opening section described above is provided on the bottom side, but it may be provided on a lateral side. Further, the present invention can naturally be remodeled into various versions as long as the essence of the invention remains.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   a) a photographing unit including
      i) a lens tube which holds a lens for forming an image of object light on a photographing element, and which defines an optical axis, and
      ii) a photographing board disposed on a proximal end side of the lens tube, the photographic board accommodating a photographing unit for outputting a signal photoelectric-converted by the photographing element, as an image signal; and
   b) a frame holding a finder unit and an electric board, and having an opening section formed at a predetermined portion thereof, the opening section having an opening defined at an opening end, the opening providing a path for enabling the photographing unit to be mounted on or removed from the frame, wherein the photographing unit can enter the opening along a direction which crosses with the optical axis of the lens.

2. An electronic camera according to claim 1, wherein when the photographing unit is mounted to the frame, the opening section spans and reinforces the photographing unit.

3. An electronic camera according to claim 1, wherein the opening section is situated on a bottom side of the frame.

4. The electronic camera of claim 1 wherein the direction is substantially perpendicular to the optical axis.

5. The electronic camera of claim 1 wherein the opening section of the frame is arranged between, and bridges, two sides of the frame.

6. The electronic camera of claim 5 wherein a side of the opening section opposing the opening end side is adjacent to a portion of the frame.

7. An electronic camera comprising:
   a) a photographing unit including
      i) a lens tube which holds a lens for forming an image of object light on a photographing element, and
      ii) a photographing board disposed on a proximal end side of the lens tube, the photographing board accommodating a photographing element for outputting a signal photoelectric-converted by the photographing element, as an image signal; and b) a frame being a principal structural unit of the electronic camera, and having an opening section at a predetermined portion thereof, the opening section being surrounded by frame portions except at an opening end, thereby defining a bridgeable shape, the photographing unit being assembled with the frame from the opening end of the opening section.

8. An electronic camera according to claim 7, further comprising:

c) a finder unit; and d) an electric board, wherein the finder unit and the electric board are assembled onto the frame.

9. An electronic camera according to claim 7, wherein the frame has a lower end side opened to form a bridgeable shape.

10. An electronic camera comprising:

a) a photographing unit including i) a lens barrel, the lens barrel defining an optical axis, ii) a photographing board provided on a proximal end of the lens barrel, and iii) an image sensor mounted on the photographing board; and b) a frame including i) an upper portion elongated in a horizontal direction along an upper surface of the camera, ii) a right portion located on one side of, and being substantially perpendicular to, the upper portion, iii) a left portion located on another side of, and being substantially perpendicular to, the upper portion, and iv) an opening portion located below the upper portion and between the left portion and the right portion, the opening portion having an opening end opposite the upper portion, the opening end defining a path for enabling the photographing unit to be mounted on or removed from the frame, wherein the photographing unit can enter the opening along a direction which crosses the optical axis of the lens.

11. An electronic camera according to claim 10, wherein when the photographing unit is mounted to the frame, the opening section spans and reinforces the photographing unit.

12. An electronic camera according to claim 10, wherein the opening section is situated on a bottom side of the frame.

13. An electronic camera according to claim 10, further comprising:

c) a finder unit; and d) an electric board, wherein the finder unit and the electric board are assembled onto the frame.

* * * * *